United States Patent [19]

Bristol

[11] Patent Number: 5,741,140
[45] Date of Patent: Apr. 21, 1998

[54] ADJUSTABLE ARMATURE ASSEMBLY DEVICE

[76] Inventor: Kent L. Bristol, 1210 Belleforte, Oak Park, Ill. 60302

[21] Appl. No.: 530,985

[22] Filed: Sep. 20, 1995

[51] Int. Cl.$^6$ .................................................. G09B 19/10
[52] U.S. Cl. ............................................ 434/82; 446/374
[58] Field of Search ............................ 434/82; 446/374; 428/542.4

[56] References Cited

U.S. PATENT DOCUMENTS

| 2,109,422 | 2/1938 | Haughton | 446/374 |
| 2,545,210 | 3/1951 | Moore | 434/82 |
| 3,055,119 | 9/1962 | McEwen | 434/82 |
| 3,284,940 | 11/1966 | Dahl | 446/374 |
| 4,674,981 | 6/1987 | La Padura | 434/82 |

FOREIGN PATENT DOCUMENTS

| 412263 | 4/1925 | Germany | 446/374 |
| 4040737 | 7/1991 | Germany | 496/374 |
| 140809 | 10/1934 | United Kingdom | 446/374 |

*Primary Examiner*—Paul J. Hirsch
*Attorney, Agent, or Firm*—Barbara R. Greenberg

[57] ABSTRACT

An adjustable armature assembly device is disclosed where the assembled armature may be adjusted rotationally and longitudinally during figure modeling when a sculptor desires to alter the original figure composition and size. In addition, a means for detaching sections of a work during and after the sculpting process is disclosed. An embodiment of the invention comprises a plurality of appendage members, of hand and feet members, a torso member, a head member and inner surface threaded or unthreaded tubular sleeve segments used to assemble, adjust and disassemble armature appendages. Also, the head member is adjusted rotationally and longitudinally and can be removed by screw means and the armature is removed from a support structure by screw means using a threaded connector segment so that no unwanted armature protrusion extends from a completed work of art.

6 Claims, 2 Drawing Sheets

ADJUSTABLE ARMATURE ASSEMBLY DEVICE

BACKGROUND OF THE INVENTION

This invention relates to the art of sculpturing and, more particularly, to supporting frameworks such as armatures used initially to provide a shape for a desired work, to receive and retain pliable material for sculpting such as clay, and then, to provide a means for changing the shape, proportions and composition of a sculptured work in progress, a means for detaching sections of the work during the creative process in order to work with ease on a small section of the work, a means for removing the work from an armature stand so that there is no interference from an armature protrusion projecting from the finished work and a means for casting the finished work in convenient sections. This invention allows great flexibility during the creative process where original armature shapes can be changed as the work progresses.

Armatures, as presently known, consist of rods, wires and tubes combined to erect rigid frameworks of various sizes and shapes to depict a predetermined subject and composition. Once the framework is assembled and the creative process is started, there is no means for changing the composition, size, shape and proportions of the work.

U.S. Pat. No. 4,674,981 to LaPadura shows wires fashioned into a variety of selected shapes to form a modeling armature. U.S. Pat. No. 3,395,484 to Smith shows an internal wire skeleton or armature formed in the shape of a doll. U.S. Pat. No. 3,055,119 to McEwen reveals inner and outer telescoping members secured in various positions to form rigid frameworks for figures. U.S. Pat. No. 2,803,903 to Barry shows a knockdown skeleton frame assembled into an armature for modeling a preselected object. U.S. Pat. No. 2,545,210 to Moore describes a wire frame armature erected and supported by a perpendicular post inserted in an armature collar socket. U.S. Pat. No. 2,109,422 to Haughton shows a lead wire figure that can be bent to form a puppet, doll or toy animal and receive conforming textile material. None of the above mentioned armatures can be adjusted to change composition, size, shape and proportions of a sculpted work during the creative process nor can any of the above mentioned armatures undergo separation of work segments during sculpting and after the work is finished for easy casting.

It is, therefore, an object of this invention to provide an armature assembly device where tubular securing sleeve segments connect and disconnect armature sections when the armature is initially shaped and, also, during and after the sculpting process to allow changes in composition, shape and size while a work is in progress. Also, a further object of this invention is to provide an armature assembly that allows easy casting of a completed sculpture and an armature that can be reused after casting. Another object of this invention is to provide a means for removing a completed sculpture from a support system where no armature protrusion extends from the sculpture.

Other and further objects, advantages and features of this invention will be made clear and become obvious by reference to the following description and claims.

SUMMARY OF THE INVENTION

The abovementioned and other objects of the invention are achieved by providing an armature assembly device for a human figure comprising a plurality of solid, wire like, bendable appendage members, a plurality of tubular sleeve connector segments either with inner surface threads or without such threads, a plurality of hand and feet members with a tubular sleeve end portion and an opposite end crimped portion securing flexible wires, a head member having a wire like curved head portion extending into a bendable outer surface threaded neck portion, and a torso construction comprising a plurality of solid, wire like bendable members curved to represent shoulder, waist and hip torso shapes separated by a tubular vertically and rotatably movable L-shaped member joined together with a plurality of crimped sleeves to form a single torso member. For additional armature support and to receive and retain pliable, clay like material, wire is wrapped around the solid, wire like bendable member hip and shoulder portions. The armature is preferably assembled into a framework where appendage member are cut to proper proportional lengths and secured to torso member wire like shoulder and hip portions by sleeve segments. Then hand and feet members are secured to appendage members and a head member is secured to the torso tubular L-shaped member. The human figure armature framework may be placed on its back, the appendages bent downward and the neck portion elongated to form a horse shaped armature. Further shortening of the arm appendages and proper tilting of the torso can result in a dinosaur armature.

As pliable material, such as clay is applied to a preformed armature in the creative process of forming a work of art, the artist may cut through the pliable material to the armature and slip off hands or feet or unscrew appendages or the head in order to sculpt the removed member separately from the complete figure or in order to readjust the position of the removed member. Reattachment of members removed is accomplished by slipping or screwing removed members back into tubular sleeve segments and rejoining cut pliable material. Then work is resumed on the entire sculpture. In addition, member positions may be changed as modeling proceeds and pliable material is added by simply rotating the member where it is joined to a hip or shoulder bendable member portion by means of a sleeve segment. A conventional armature cannot make this adjustment once pliable material is built on to the armature. When the sculpture is ready for casting, members can be removed in the same manner as described above and separate molds can be prepared where venting may not be necessary or simple venting can easily be provided. When an entire figure is cast in one piece, a complex system of vents is sometimes needed to remove air bubbles and it may be necessary to make several sections before a mold is prepared. When the sculpting and casting process is complete, the pliable material can be removed from the armature and the armature can be reused.

In the preferred embodiment, the armature is assembled to represent a human figure where connecting sleeve segments are threaded internally at one end connected to the torso member and not threaded at the other end connected to the appendage members. This allows easy removal of appendages that may be in a variety of positions in relation to the torso member where extensive twisting of an appendage is not needed for removal. Using a screw means to connect sleeve segments to the torso member provides strength and rigidity needed for the armature to support pliable clay like sculpting material. However, in another embodiment, the connecting sleeve segments may not contain internal surface threads so that connecting appendage members and torso member wire like shoulder and hip portions telescope into connector sleeve segments and are secured by friction force. This arrangement works well for small armatures where a minimal amount of pliable, clay like material is needed.

BRIEF DESCRIPTION OF THE DRAWINGS

A complete understanding of this invention may be gained by considering the following detailed description of the invention and claims, in conjunction with the accompanying drawings, in which:

DETAILED DESCRIPTION OF THE INVENTION

Figure 1:
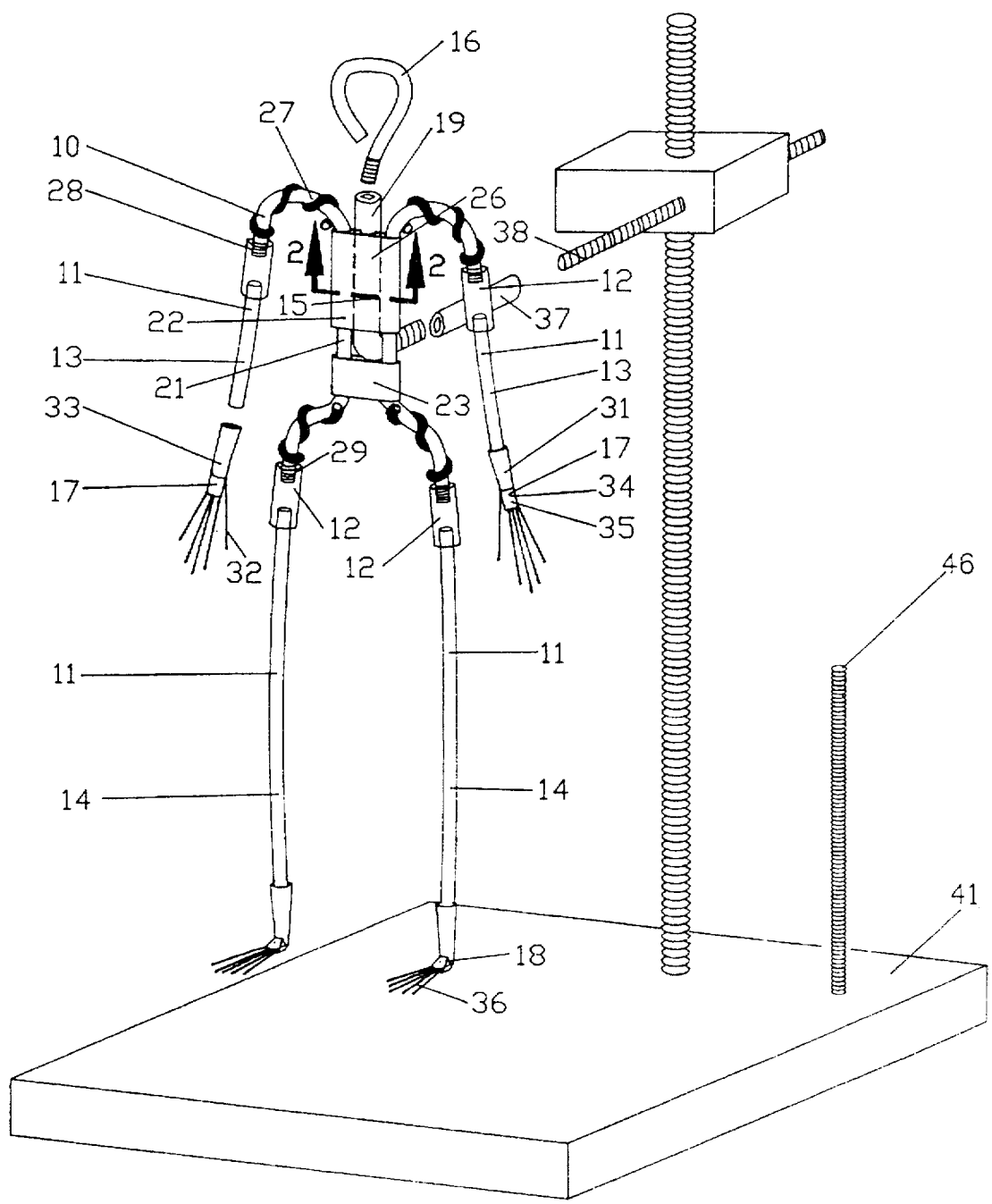
FIG. 1 is a front elevation of a preferred embodiment of the armature in a human figure framework showing armature connection to a supporting stand.
Figure 5:
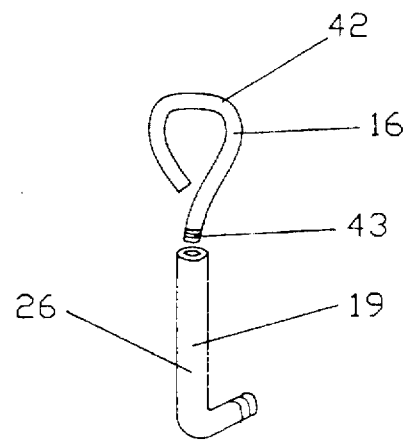
FIG. 5 is a detail plan view of an armature head connected to a vertically and rotatably movable L-shaped tube.
Figure 3:
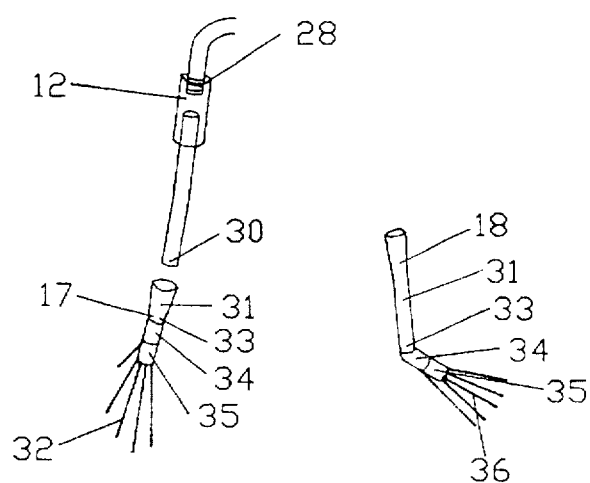
FIG. 3 is a detail plan view of an appendage member secured by a sleeve segment to a torso member and a detailed hand and foot member are illustrated separately.

Referring to FIG. 1, there is illustrated an armature 10 for sculpting a human figure comprising a plurality of flexible, sturdy, wire like appendage members 11 including arm members 13, leg members 14, and a torso member 15, a head member 16, a hand member 17 and a foot member 18 where appendage members 11 are secured in an infinite number of rotational and longitudinal positions to torso member 15 by means of tubular sleeve connector segments 12 as shown in detail in FIG. 3, and head member 16 is secured to torso member 15 by screw means as shown in FIG. 5. In addition, hand member 17 and foot member 18 are slipped on to appendage members 11 to form an adjustable human figure armature.

Figure 2:
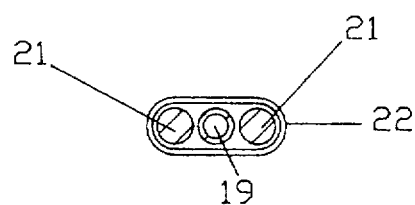
FIG. 2 is a transverse section of the human figure armature torso taken on lines 2—2 of FIG. 1.

FIG. 2 illustrates a transverse section of the torso member 15 taken along line 2—2 of FIG. 1 comprising an upper torso clamping tube 22 enclosing sturdy, flexible wire like members 21 oppositely deposed and adjacent to a centrally positioned L-shaped tubular sleeve 19, the sturdy, flexible wire like members 21 spaced to allow the L-shaped tubular sleeve 19 to be vertically and rotationally adjusted by sliding it up and down or moving it from side to side. For additional strength, wire like member 21 hip and shoulder portions are supported by smaller diameter twisted wires 27.

FIG. 3 illustrates a detailed drawing of a securing means for appendage member 11 to be secured to sturdy, flexible wire like member 21 axially threaded shoulder end portion 28 or axially threaded hip end portion 29 where the securing means comprises a tubular sleeve connector segment 12 having a threaded inner tubular surface to receive at one end by screwing means threaded shoulder or hip ends portions 28, 29 and to receive at the other end telescopically inserted appendage member 11 secured by frictional force. The hip and shoulder end portions 28, 29 secured by screw means allow infinite rotational adjustments with arm appendage members 13 and leg appendage members 14 and, also, longitudinal adjustment means before and during the sculpting process. By telescopically inserting appendage member 11 into tubular sleeve connector segment 12, an infinite number of longitudinal and rotational adjustments are made by applying push, pull and rotational forces to appendage member 11. Appendage members 11 are easily detached and reattached in armature preparation and during the sculpting process and can be finally detached for casting of the finished work. During sculpting, a cut through pliable modeling material at the tubular sleeve connector segment 12 location, or in its vicinity allows the sculptor to slip off the appendage member 11 from the work in progress for easy to manage detailed sculpting on the removed appendage member 11. The removed appendage member 11 is reattached by insertion into the tubular sleeve connector segment 12 and repairing the pliable cut clay like material. In additional to detachment and reattachment, appendage members 11 can be rotated during the sculpting process.

FIG. 3 also illustrates appendage member 11 securing means to hand member 19 where appendage member 11 distal end portion 30 is telescopically inserted into hand member's tubular sleeve end 31 secured by friction force and rotatably and longitudinally adjustable to an infinite number of positions. Simulated fingers 32 are secured to hand member 17 distal end 33 by a first crimped tubular end 34 securing a simulated thumb wire and a second crimped tubular end portion 35 securing simulated finger wires. A foot member 18 is illustrated having the same construction as hand member 17 where wires 36 are used to sculpt toes, claws or other digits required by a sculptor' subject matter. The foot member 18 as illustrated in FIG. 3 shows a right angle ankle foot joint bend at the first crimped end portion 34 to simulate a walking foot. Depending on the sculptor's subject matter, the angle of the ankle foot joint bend as determined by the sculptor may be at an infinite number of angles but would usually fall between 45 degrees to 180 degrees. Toe digit wires 36 may be cut to represent a variety of foot shapes such as a paw, a hoof or an alien creature foot. To detach hand member 17 and foot member 18 while a work is in progress, the sculptor may make a cut in pliable clay like modeling material in the vicinity of the hand 17 or foot 18 tubular sleeve end 31 and slip off the hand 17 or foot 18, reattaching the hand member 17 or foot member 18 by telescopically inserting the appendage member 11 into the hand 17 or foot 18 tubular sleeve end 31 and repairing the pliable clay like modeling material cut portion.

Figure 4:
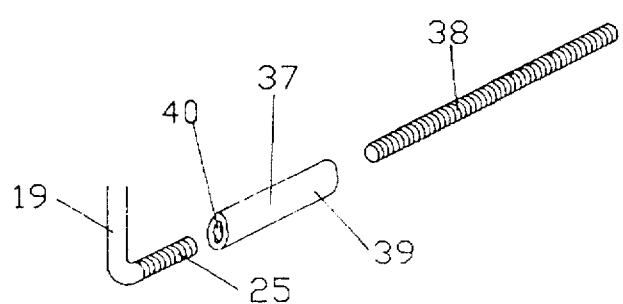
FIG. 4 is a detail plan view of an armature support structure connecting sleeve.

FIG. 4 is a detailed view of the human figure armature 10 connector means 37 to a support structure threaded rod 38, the connecting means 37 comprising a rigid tubular segment 39 having a diameter larger than the L-shaped tubular sleeve 19 external surface threaded horizontal portion 25 diameter and larger than the support structure threaded rod 38 diameter, the rigid tubular segment 39 having a rotationally threaded inner surface. By insertably rotating the connecting means 37 around the L-shaped tubular sleeve 19 horizontal outside threaded portion 25 and around the support structure threaded rod 38, the user can secure the human figure armature 10 to an armature support structure 41 as shown in FIG. 1. The L-shaped tubular sleeve 19 horizontal portion 25 is long enough to be secured by the connecting means 37 but short enough to be covered by pliable clay like material as a desired object is formed. Before and during sculpting, and after the sculpting is completed, the armature 10 can be removed by rotating the connecting means 37. When sculpting is completed, the horizontal portion 25 is covered with pliable, clay like material so no unwanted armature protrusion remains. Also, connecting means 37 can be screwed to support structure vertical rod 46 to connect the L-shaped tubular sleeve 19 when a horse shaped armature is used.

FIG. 5 illustrates the armature head member 16 with a freely curved skull portion 42 and a neck portion 43 shaped from flexible, sturdy wire like material. The neck portion 43 has outer surface axial threads and a diameter less than the L-shaped tubular sleeve 19 inner surface axial threaded vertical portion 26. The head member 16 is connected by screwing means to the L shaped tubular sleeve 19. The armature head member 16 can be rotated to an infinite number of positions before and during sculpting and the flexible neck portion 43 can be bent to form a desired pose and changed as the sculpting proceeds. Head member 16 removal is achieved during sculpting by cutting pliable clay like material applied to a figure's neck portion 43 and rotating the skull shaped portion 42 until it is released from the neck portion 43. The head member 16 can have a longer than human figure neck portion 43 when an animal such as a horse or a dinosaur is contemplated as the subject for creation.

Figure 6:
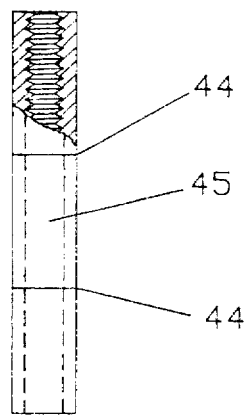
FIG. 6 is a plan view of threaded connector sleeve tubing showing suggested cuts for preparation of variable length connector sleeves.

A method for preparing inner surface axially threaded connector tube segments 12 is shown in FIG. 6 where cuts 44 are made using a metal cutting tool along a tube 45 to prepare connector tube segments 12 of desired lengths where longer tubes can be used to lengthen arm member 13 and leg member 14. During sculpting, when an appendage 11 is removed, an exposed connector tube segment 12 can be unscrewed and replaced with a newly prepared connector tube segment 12. An unthreaded tube may also be used in the same manner to prepare connector segments without threads. Connecting arm members 13 and leg members 14 to the torso member 15 by screw means provides an armature 10 that will support a large amount of pliable clay like material. In another embodiment, when a small work is contemplated, unthreaded tubular connector segments will remain secure when sculpting materials are applied. The human figure armature 10 as described will support works approximately fifteen to ten inches high when one-eighth inch diameter wire is used and works approximately forty five to fifty inches high when three eighth inch diameter wire is used. Also, small projections on appendage member 11 wire like surface may be included to help sculpting material adhesion in large sculptures.

In the preferred embodiment, aluminum wire is used for appendage members 11, for free formed flexible wire like members 21 and head member 16, brass alloy is used for tubular structures 12, 19, 22, 23, 31, 39 and copper wire is used for twisted support wire 27, fingers 32 and toes 36. Other sturdy, flexible wire like materials having the physical properties of aluminum, brass and copper may also be used for armature 10 construction.

Although more than one embodiment of this invention has been illustrated, it is to be understood that various changes in the materials and rearrangement of the parts may be made by those skilled in the art without departing from the spirit of the invention disclosed; and such changes in the materials and parts are properly within the scope of the following claims:

What is claimed is:

1. An adjustable armature assembly device for construction of a human figure armature for receiving pliable, clay like material which comprises:

a plurality of flexible, sturdy, wire like, bendable appendage members;

a plurality of hand members and foot members having a tubular end and an opposite end crimped portion securing flexible wires to simulate fingers and toes;

a flexible, sturdy, wire like head member having a head portion and a neck portion;

a torso member having a plurality of clamping tubes where an upper clamping tube secures freely formed hip, waist and shoulder members and an L-shaped tubular sleeve and a lower clamp secures only freely formed hip, waist and shoulder members; and a plurality of tubular sleeve connector segments.

2. The adjustable armature assembly device of claim 1 wherein said appendage members distal ends receive telescopically said hand and foot members tubular ends, said appendage members proximal ends are secured telescopically by means of tubular sleeve connector segments to said hip, waist and shoulder torso members and said head member is rotationally and longitudinally adjusted by screw means to said torso member L-shaped tubular sleeve to form a human figure armature that may be disassembled and adjusted during and after a sculpting process.

3. The tubular sleeve connector segments of claim 1 wherein said connector segments have an internally threaded end to strongly secure a freely formed hip, waist and shoulder member threaded end portion.

4. The adjustable armature assembly device of claim 1 wherein said torso member L-shaped tubular sleeve is threaded externally along an L-shape horizontal portion to receive an internally threaded rigid tubular segment and wherein said tubular segment opposite end receives by screw means a support structure threaded rod.

5. The adjustable armature assembly device of claim 4 wherein said L-shaped horizontal portion of said tubular sleeve is sized to be covered by pliable sculpting material at the completion of a sculpture.

6. The adjustable armature assembly device of claim 1 reconfigured to form a horse shaped armature by placing said human figure armature on its back, bending the appendages downward and elongating the neck to form a horse shape.

* * * * *